Figure 1:
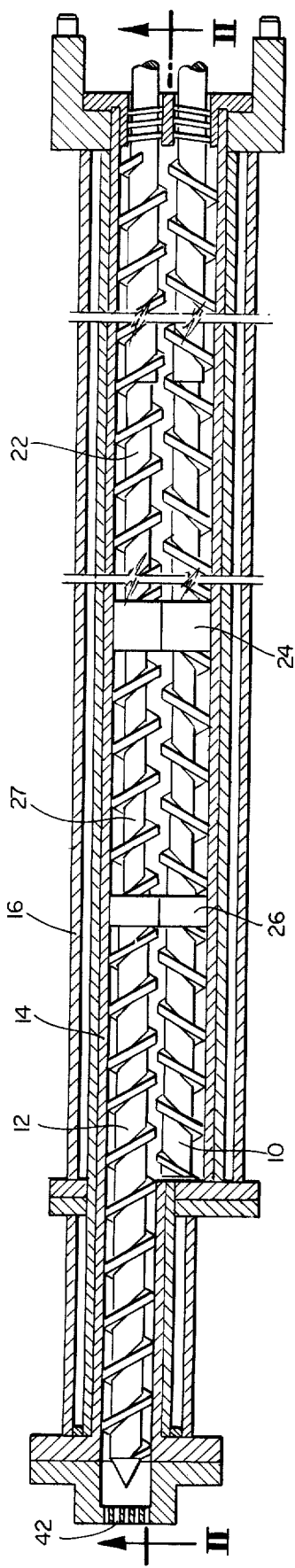

United States Patent

Skidmore

[11] 3,917,507
[45] Nov. 4, 1975

[54] COUNTERCURRENT COMBINED LIQUID AND VAPOR STRIPPING IN SCREW DEVOLATILIZER

[75] Inventor: Richard H. Skidmore, Strafford, Pa.

[73] Assignee: Welding Engineers, Incorporated, King of Prussia, Pa.

[22] Filed: Sept. 27, 1973

[21] Appl. No.: 401,360

Related U.S. Application Data

[63] Continuation-in-part of Ser. No. 117,332, Feb. 22, 1971, Pat. No. 3,799,234.

[52] U.S. Cl. ............... 159/2 E; 264/101; 264/102; 259/192; 425/204
[51] Int. Cl.² ... A21C 1/06; A01J 17/00; B01D 1/28
[58] Field of Search ...... 159/2 E, DIG. 10; 259/191, 259/192; 264/101, 102, 349; 425/204

[56] References Cited
UNITED STATES PATENTS

| | | |
|---|---|---|
| 3,046,609 | 7/1962 | Bergmeister et al. ............... 159/2 E |
| 3,253,892 | 5/1966 | Brignac ............................... 159/2 E |
| 3,376,603 | 4/1968 | Colombo ............................ 159/2 E |
| 3,535,737 | 10/1970 | Hendrg ............................... 259/191 |
| 3,683,511 | 8/1972 | Johnson et al. ..................... 34/9 |
| 3,738,409 | 6/1973 | Skidmore ........................... 159/2 E |
| 3,742,093 | 6/1973 | Skidmore ........................... 264/349 |
| 3,799,234 | 3/1974 | Skidmore ........................... 159/2 E |
| R23,948 | 2/1955 | Fuller ................................. 159/2 E |

FOREIGN PATENTS OR APPLICATIONS 915,689  7/1954  Germany ........................... 159/2 E

*Primary Examiner*—Jack Sofer

[57] ABSTRACT

Impurities or undesirable components are stripped countercurrently from a plastic material in a screw extruder filled with such material by injecting a stripping agent which is, or forms, a liquid-gas mixture in the extruder, flowing the liquid-gas mixture countercurrently of the plastic material, and removing a significant portion of the gas portion of the injected material combined with the volatile undesirable components and the liquid combined with other components, all at a point upstream of the point of injection.

9 Claims, 2 Drawing Figures

U.S. Patent  Nov. 4, 1975  3,917,507

COUNTERCURRENT COMBINED LIQUID AND VAPOR STRIPPING IN SCREW DEVOLATILIZER

This application is a continuation-in-part of Ser. No. 117,332, filed Feb. 22, 1971, now U.S. Pat. No. 3,799,234.

This invention relates to a process and apparatus for removal of volatile and soluble components from plastic material in a screw extruder, and particularly for removal of residual amounts of solvent and soluble impurities in a polymer in a multistage screw extruder-devolatilizer.

Devolatilization of plastic material, such as styrene-butadiene elastomer (SBR), in a screw extruder, as the material is worked and heated by the extruder, through vapor vents located along the length of the extruder, is well known. One such process and apparatus in which such vapor draw-offs are maintained at successively lower pressures in successive stages is disclosed and claimed in my U.S. Pat. No. 3,082,816. While this process and apparatus is effective to remove a substantial proportion of the solvent from the plastic mass, there remains in most cases residual solvent in the amount of from 1,000 to 5,000 parts per million. The presence of this residual solvent deleteriously effects many of the physical characteristics of the resin.

The patent to Schnell et al. U.S. Pat. No. 3,267,075 discloses a process for removing impurities from polycarbonates, in which impurities are subjected to removal by injection of inert materials. In polycarbonates, which contain chlorides, water is not an inert material and its use in polycarbonates is contra-indicated. The process of the Schnell patent provides co-current flow of the inert material with the polycarbonate, with the result that the inert material contains a maximum amount of impurities as it leaves the polycarbonate. This limits the effectiveness of the stripping operation.

In copending patent application Ser. No. 117,332, filed Feb. 22, 1971, of which this is a continuation-in-part, the patent to Schutze et al. U.S. Pat. No. 2,944,047 was cited, which shows the introduction of an oxygen-free gas into an extruder zone to act as a gas blanket and to prevent reaction of the polymer in the extruder zone to render the polymer "color-free." However, the gas was used only as a gas blanket and was not caused or induced to flow countercurrent to the flow of plastic material.

The patent to Houser et al. U.S. Pat. No. 3,203,943 discloses the idea of treating material in solid particulate form, which material is not deformed or kneaded by the action of the worm flights in an extruder. Other references cited in the aforementioned parent application include the patent to Hawkins et al. U.S. Pat. No. 2,949,447, Brignac et al. U.S. Pat. No. 3,253,892, and Colombo U.S. Pat. No. 3,376,603.

It has now been discovered that unpredictably active stripping of impurities from plastic materials can be obtained by sweeping a continuous stream of a mixture of liquid and vapor in a countercurrent manner through the molten viscous plastic as it is worked in the extruder. Both the liquid phase and the gaseous phase of the injected material flow countercurrently in relation to the flow of plastic material, and the liquid together with solid, soluble impurities such as salts, soaps, etc., and other undesired substances that it has picked up and that are soluble in the liquid portion of the sweep are separated from the plastic material at a point upstream of the point of injection. Similarly, the gaseous phase of the injected material together with the volatiles that it has picked up, is also separated from the plastic along with the liquid at a point upstream of the point of injection.

The injected material may already be a mixture of liquid and gas, as injected. For example, a mixture of steam and pressurized hot water, is equilibrium with each other, may be injected as such. On the other hand, the injected material may preferably be a liquid which partially flashes to vapor upon or after injection; a typical example is hot water under a pressure which is higher than the pressure of the plastic material at the point of injection.

In any event, it is a feature of critical importance that a mixture composed of significant amounts of both liquid and gas must sweep the plastic in a countercurrent direction. This achieves remarkably effective removal of impurities, solvents, or other undesirable materials from the plastic. The advantages are far in excess of the further advantage that the clean incoming injected materials contact the cleanest portion of the plastic, radically reducing the percentage of impurities finally appearing in the product. Also, it has been discovered that there is almost no limitation on the quantity of injectible mixture of liquid and gas that can be used in such countercurrent flow in an extruder; this provides the opportunity for even greater stripping capability.

It is therefore an object of the present invention to provide a process and apparatus for effective and economical removal of volatile and liquid components, particularly small residual amounts thereof, from a plastic mass in a screw extruder.

It is also an object of the present invention to provide a continuous screw extruder for working and devolatilizing a plastic mass including improved means for removing therefrom small residual amounts of volatile and non-volatile components.

These and other objects are met by a process and apparatus in which a material is injected in such a manner as to provide a mixture of liquid and gas for flow countercurrently to the flow of the plastic in a screw extruder by injection at a point where it is filled with molten viscous plastic material and at least a major part of the gas and the liquid, one combined with volatile material and the other with non-volatile material to be removed from the plastic material, are removed from the extruder at a point or points upstream from the point of injection. The gas and liquid are conveniently removed together by using a mechanical filter of a special type, as will be further disclosed in detail hereinafter.

According to this invention the combination of liquid and gaseous phases whether injected as such or formed in the extruder, travels countercurrently to the plastic material with such inter-activity that unprecedented stripping effectiveness of both gaseous and liquid phases is achieved with unanticipated rapidity. After stripping, the gaseous phase, combined with volatile components stripped from the plastic, is removed at a location upstream of the point of injection. The liquid phase, combined with other components is also taken off upstream of the injection point and often leaves by entrainment in the gas. It has been noted that while some of the injected material also moves downstream, at least the majority moves upstream.

In another form of the invention, the injected material is in a single phase, such as a liquid, but changes into a mixture of two phases upon injection or thereafter at some point in the extruder. Hot water, at high pressure, flashes partially into steam when injected into plastic material which is maintained at a lower pressure. The percentage which flashes varies depending upon the degree of the pressure drop and upon the temperature and pressure in the extruder and the temperature and pressure of the injected hot water. By controlling the foregoing variables, even to the extent of using a cold liquid, when cooling is desired, it is possible to control the liquid-to-gas ratio in the countercurrent sweep and to obtain optimum conditions in a particular operation.

According to this invention, when water or steam are used, the steam passes in admixture with hot water through the polymer countercurrently with agitation, stripping out the solvent molecules; the worm flights are completely filled with viscous liquid plastic at the point of injection and an intimate mixture of counterflowing fluids develops, such that the stripping action does not depend upon diffusion through the plastic mass.

As stated, the vapor and gas removal is preferably accomplished through twin interlocking screws pitched and rotated so as to return solid materials to the extruder while selectively permitting the escape of liquid and gases simultaneously therethrough.

Although not part of the present invention, the volatile component removal process may be even further enhanced by the injection of water into the plastic mass for purposes of cooling the plastic mass at a point downstream of a pressure seal which is downstream of the injection and withdrawal points. A subsequent reduced pressure vapor removal vent not only removes the water thus injected but also carries off with it some of the steam previously injected along with volatile components combined therewith.

Figure 2:
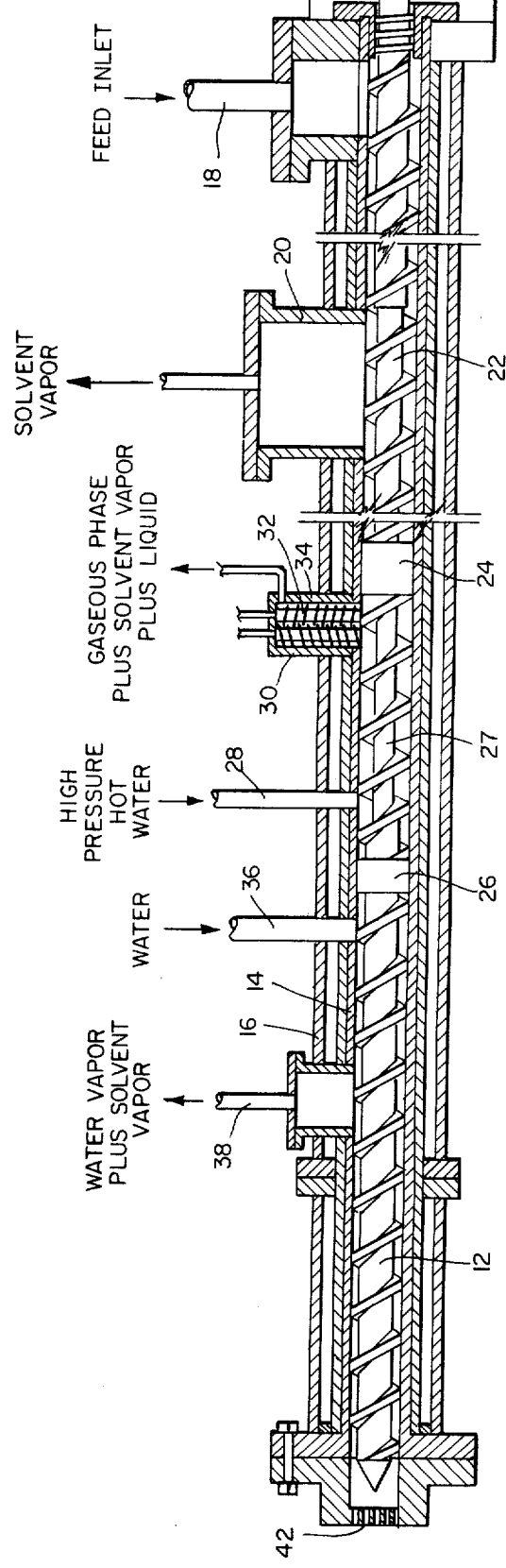

This invention may be better understood by reference to the following detailed description, taken in conjunction with the accompanying drawings in which:

FIG. 1 is a sectional plan view of a twin screw extruder embodying features of the present invention; and FIG. 2 is a sectional side view of the apparatus shown in FIG. 1.

Referring now to FIGS. 1 and 2, twin extruder screws 10 and 12 are enclosed in a housing or barrel 14 surrounded by a heating jacket 16. Polymeric material entering through feed inlet 18 is worked, kneaded and conveyed by screws 10 and 12 to at least one vapor removal section which includes a vapor removal vent 20 adjacent to a reduced-diameter shaft section 22 of the extruder screws. Several such vapor removal sections may be utilized in a known manner; the vapor removal pressure in each may be controlled independently when the stages are separated by pressure seals of the plastic material, which seals are conveniently formed by cylindrical or reverse-pitch screw segments.

Following one or more devolatilization sections utilizing a reduced-diameter worm and a vent as illustrated in FIGS. 1 and 2, residual amounts of volatile and non-volatile components in the plastic mass are removed according to this invention in a separate section of the extruder apparatus which includes a first pressure seal-forming pair of cylinders 24 and a back pressure pair of seal-forming cylinders 26. These cylinders 24 and 26 have a close-running clearance in the barrel 14 to form the seals. In the segment of the extruder screws between the sealing cylinders 24 and 26, a reduced-diameter-shaft screw section 27 is provided so that the plastic material flowing continuously past the pressure seal at cylinders 24 undergoes a sudden pressure drop and flashes off some volatiles; it will be realized that a low pressure is maintained in the plastic mass near the vent 30. However, the screw section 27 has worm flights that are so pitched that the downstream part of section 27 is kept filled by the back pressure cylindrical seals 26 and is maintained at a pressure that is substantially higher than the material pressure adjacent to the vent 30. It will be noted that the shaft diameter of screw section 27 increases in the region of the cylindrical seals 26, but this is not necessary to maintain the pressure.

According to this invention, an injection pipe 28 is provided upstream of seal 26 and downstream of seal 24. The injection means may include one or more inlets into the extruder barrel and is, of course, connected to a source of injected liquid or gas-liquid mixture as heretofore described. Vent 30 is provided in the same extruder section 27, upstream from the point of injection.

It is important that the injection be made at a point intermediate a higher pressure downstream point and a lower pressure upstream point, and that the injection point be selected so that the injection pressure shall be less than said higher pressure and greater than said lower pressure.

This is considered surprising; it has been discovered that it is not the direction of flow of the viscous pressurized plastic material that determines the direction of flow of the gas-liquid mixture, but that the relative upstream and downstream pressures instead control. Further, it is surprising that the gas-liquid mixture readily and in great volume flows countercurrent to the viscous pressurized plastic material in the spaces provided in the extruder. The invention is, accordingly, of great advantage when, within the injection zone, the plastic material is starve-fed so that the screws are less than full at the upstream, low pressure area, when the screws are full and under pressure at the point of injection, and when the material is at a still higher pressure downstream of the point of injection than it is at the point of injection.

With respect to the vent 30, because of the tendency of such a vent to clog with solids escaping with the gas, a preferred vapor removal means comprises twin interlocking screws 32 surrounded by a closely fitting housing 34, with a clearance sufficient to permit only gases and liquids to pass through. Twin interlocking screws 32 are pitched and rotated by a drive motor (not shown) in a direction to force entrained solids back toward the plastic mass in the main extruder.

In the form of the apparatus shown in FIGS. 1 and 2, there is also shown an optional water inlet means 36 for purposes of injecting cooling water into the plastic mass. This water is removed in vapor removal vent 38 downstream thereof, in which there is also removed some of the gas injected in the gas injection means 28. Plastic material treated in the apparatus and thus devolatilized is then extruded through die 42.

In accordance with this invention, it has been discovered that substantially all of the volatile and non-volatile soluble components can be removed from a plastic mass in a screw extruder by injecting into the moving pliable plastic mass a material providing a non-reactive gas-liquid mixture, i.e., non-reactive with the plastic mass, which becomes mixed intimately by countercurrent flow with the plastic mass forming mixed liquid and vapor phases therein, with the result that the volatiles and solubles are removed along with the gas-liquid mixture. The injection material must, of course, be injected at a pressure above that of the plastic mass. It is preferred to keep the pressure of the plastic mass reasonably low at the point of injection, such as by using a reduced-diameter shaft on the extruder screw in the area of injection, in order to facilitate the handling and injection.

The material to be injected may be selected from a wide variety of substantially non-reactive liquid or mixed liquid and gaseous materials. The usual requirement is that it be non-reactive with the plastic material. When the material is liquid, it should volatilize partially under the conditions existing during at least a portion of its countercurrent flow path within the extruder barrel.

While this invention is useful in treating polyolefins, such as polyethylene, various other polymers and polymer-solvent systems may also be treated. In particular, polymers such as polystyrene, polypropylene, and others may be purified in accordance with this invention.

The quantities of plastic material throughput, volatile and non-volatile materials to be removed therefrom, gas to be injected therein, and the size and relative dimensions of the apparatus used in the present invention are all inter-related. The amount injected may surprisingly be varied greatly; if desired, tremendous volumes may be injected and removed concurrently. This flow rate may readily be varied depending upon the desired degree of purity to be achieved, and upon the throughput rate of the plastic material.

As a specific example, it has been found in a (small) two-inch screw diameter twin screw extruder having a 21-inch stripping section with a 1.125-inch diameter shaft and a pressure in the plastic mass of about 140 pounds per square inch, a mixture of hot water and steam at 200°C and 260 pounds per square inch may be injected conveniently at a rate of about 50 pounds per hour to strip essentially all of the remaining hexane solvent and non-volatile impurities from a 95 to 98% solids solution entering the stripping section at a rate of about 250 pounds of polymeric material per hour.

As examples of residual solvent removal from a 40% solids solution of polyethylene in mixed hexane solvent, utilizing an apparatus such as that shown in FIGS. 1 and 2 having 2-inch screws with three stages of vapor and liquid removal, having vapor draw-offs respectively at 50 pounds per square inch gauge back pressure, atmospheric, and near vacuum, and in which reverse flights downstream of the injection point were used to keep the extruder screw filled in the injection and removal area, and in which the shaft diameter in the same area was 1.125 inches, the following process runs have been made, with the results indicated.

| Sample No. | 29 | 23 | 30 |
|---|---|---|---|
| Throughput rate - PPH | 103 | 103 | 108 |
| Solvent at entry to vapor stripping section - PPM | 9708 | 15,599(1) | 9259 |
| Gas injected | None | Steam and Water | Steam |
| Injection Temperature °C | — | 174 | 183 |
| Injection Pressure - PSIG | — | 115 | 140 |
| Gas removed upstream of injection point - PPH | — | 40 | 143 |
| Gas removed downstream of injection point - PPH | — | 1.52 | 3.9 |
| Solvent content in | 497 | 0 | 0 |

-continued

| Sample No. | 29 | 23 | 30 |
|---|---|---|---|
| product - PPM | | | |

(1)4920 in feed; 10,679 added.

The percentage ratios of liquid to gas in the countercurrent sweep may vary along the length of the stripping zone, between wide limits. However, surprisingly efficient vapor stripping results are obtained when the liquid:liquid plus gas ratio is about 10–90%, preferably 25–75% and still more preferably 40–60% by weight. When the liquid and gas are composed of the same material and are in substantial equilibrium with each other, the equilibrium proportions may shift along with changes in the existing temperatures and pressures in the stripping zone.

I claim:

1. In a process for removal of a volatile component from a plastic material, the steps which comprise working said material and component in a downstream direction in a zone of an extruder, a downstream portion of said zone being filled with said material under pressure, maintaining said material at a lower pressure at an upstream portion of said zone, injecting into said plastic material at said downstream portion where said material is in a viscous condition and fully fills the interflight space at the point of injection, a substance which within said zone is a mixture of liquid and gas, causing said liquid and gas to flow as a mixture in countercurrent contact through said viscous plastic material in said zone, and removing said liquid and gas together with said volatile component at said upstream portion of said zone, said plastic material, at a location downstream of said point of injection, being maintained at a higher pressure than the pressure at said injection point.

2. A process as recited in claim 1 wherein said injected material is combined steam and hot water concurrently injected at a common point of injection.

3. A process as recited in claim 1 wherein said injected material is water, and wherein the existing temperature and pressure within said zone are provided such that a significant amount of said water flashes into vapor.

4. A process as recited in claim 1 wherein said plastic material is acrylonitrile-butadiene-styrene and the injected material is steam and hot water.

5. A process as recited in claim 1 wherein said combined gas and volatile component is removed by venting through the leakage space between twin interlocking screws rotating in a housing.

6. Apparatus for removing volatile components from a plastic material, said apparatus comprising a screw extruder having a zone, a downstream portion of which is completely full of said plastic material in a viscous condition, said zone also having an upstream portion which is at a lower pressure than said downstream portion, means connected to said downstream portion for injecting a substance which is a mixture of liquid and gas when it is in said material at said filling downstream portion and at a pressure higher than that of said filling material, means provided at a point downstream of said injection point for maintaining said plastic material at said point at a higher pressure than the pressure at said injection point, and vent means upstream of said injecting means for removing from said material said mixed liquid and gas combined with said volatile component, at a pressure lower than that at the point of injection, said mixed liquid gas and volatile component passing through said filling material.

7. Apparatus defined in claim 6, wherein means are provided for starve-feeding said material at said upstream portion.

8. In an apparatus for working a plastic material and for removing a volatile and a non-volatile component therefrom, said apparatus comprising a continuous extruder-conveyor and a housing therefor, the improvement comprising a component removal section having a worm configuration creating a predetermined relatively low material pressure at an upstream location therein, back pressure means spaced downstream of said location adapted to maintain the immediate upstream adjacent portion of said worm full of plastic material and at a higher pressure than said relatively low pressure during the operation of said apparatus, and means for introducing into said plastic material in said higher pressure immediate upstream section a gas-liquid mixture at a pressure above that of said material in said higher pressure section, and vent means upstream of said introducing means for removing said gas and liquid combined with said residual volatile component, said gas-liquid-residual-volatile-component-mixture passing through said filling plastic material.

9. An improved apparatus, as recited in claim 8, wherein said introducing means comprises a hot water source and a conduit therefrom to said apparatus.

* * * * *